Feb. 9, 1943.  G. W. BLAIR ET AL  2,310,830
MOLDING APPARATUS FOR OPEN TYPE CUSHIONS
Filed June 4, 1937  6 Sheets-Sheet 1

Inventors:
George W. Blair &
John F. Schott
By Eugene M. Giles Atty.

Feb. 9, 1943.    G. W. BLAIR ET AL    2,310,830
MOLDING APPARATUS FOR OPEN TYPE CUSHIONS
Filed June 4, 1937    6 Sheets—Sheet 3
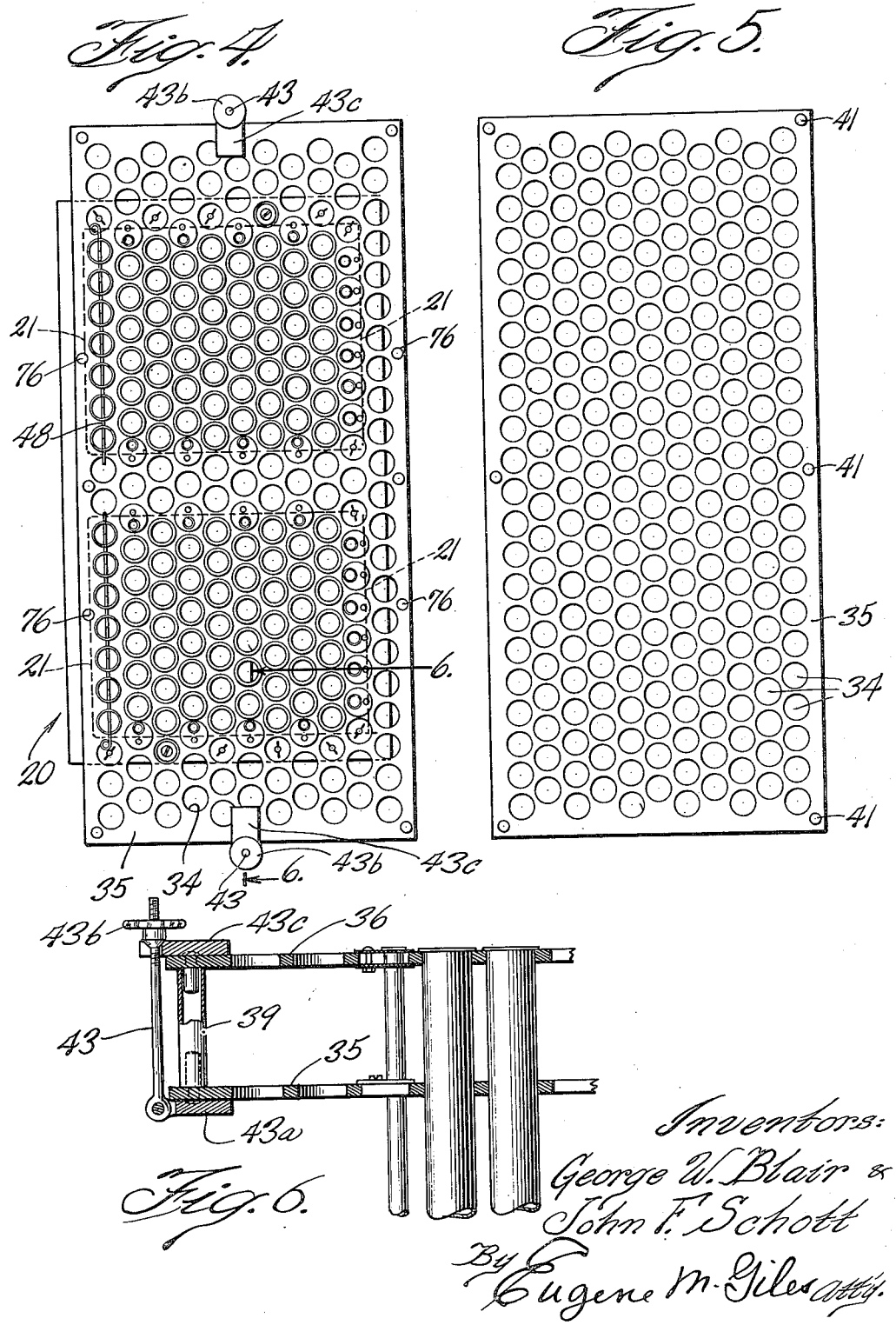

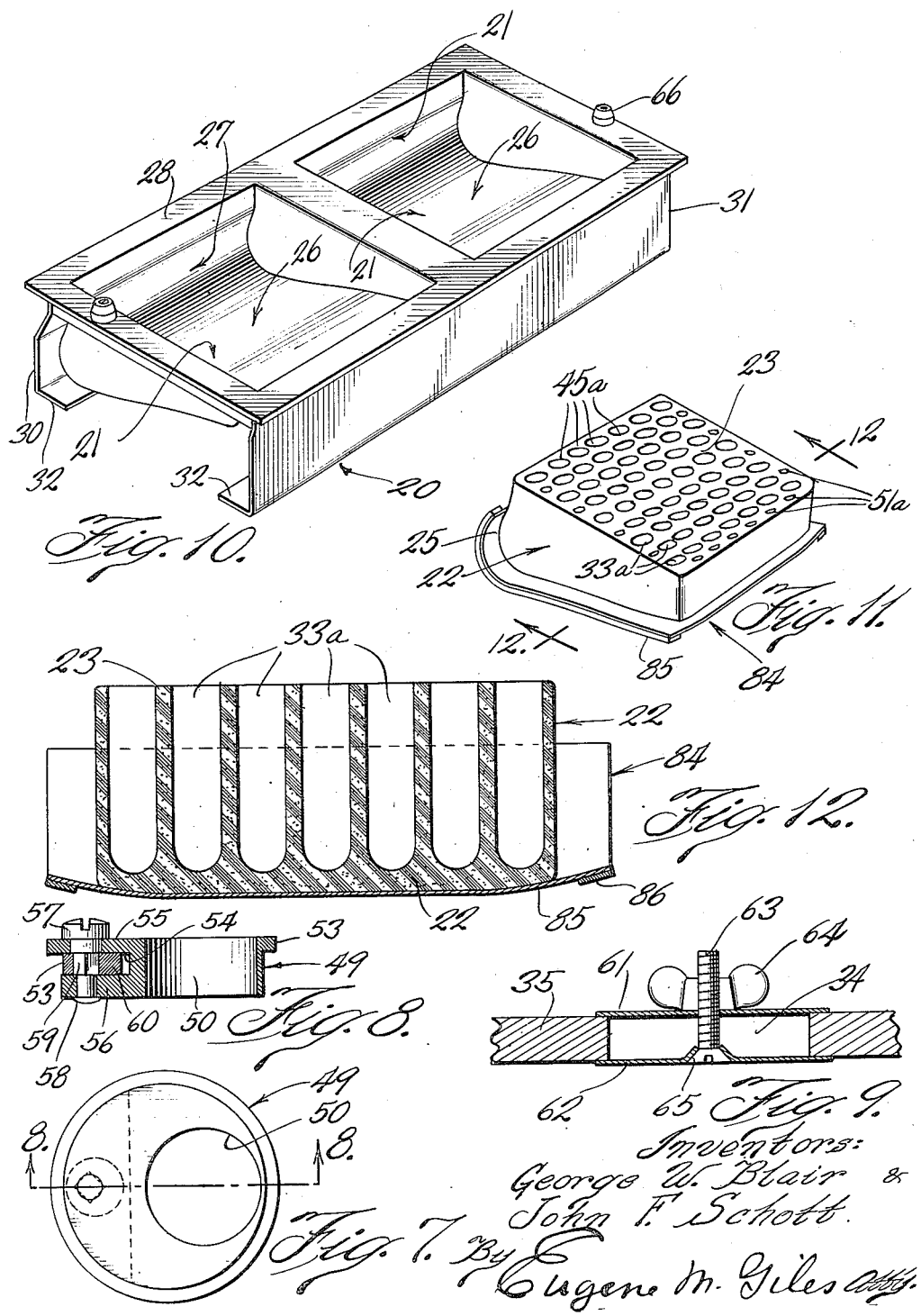

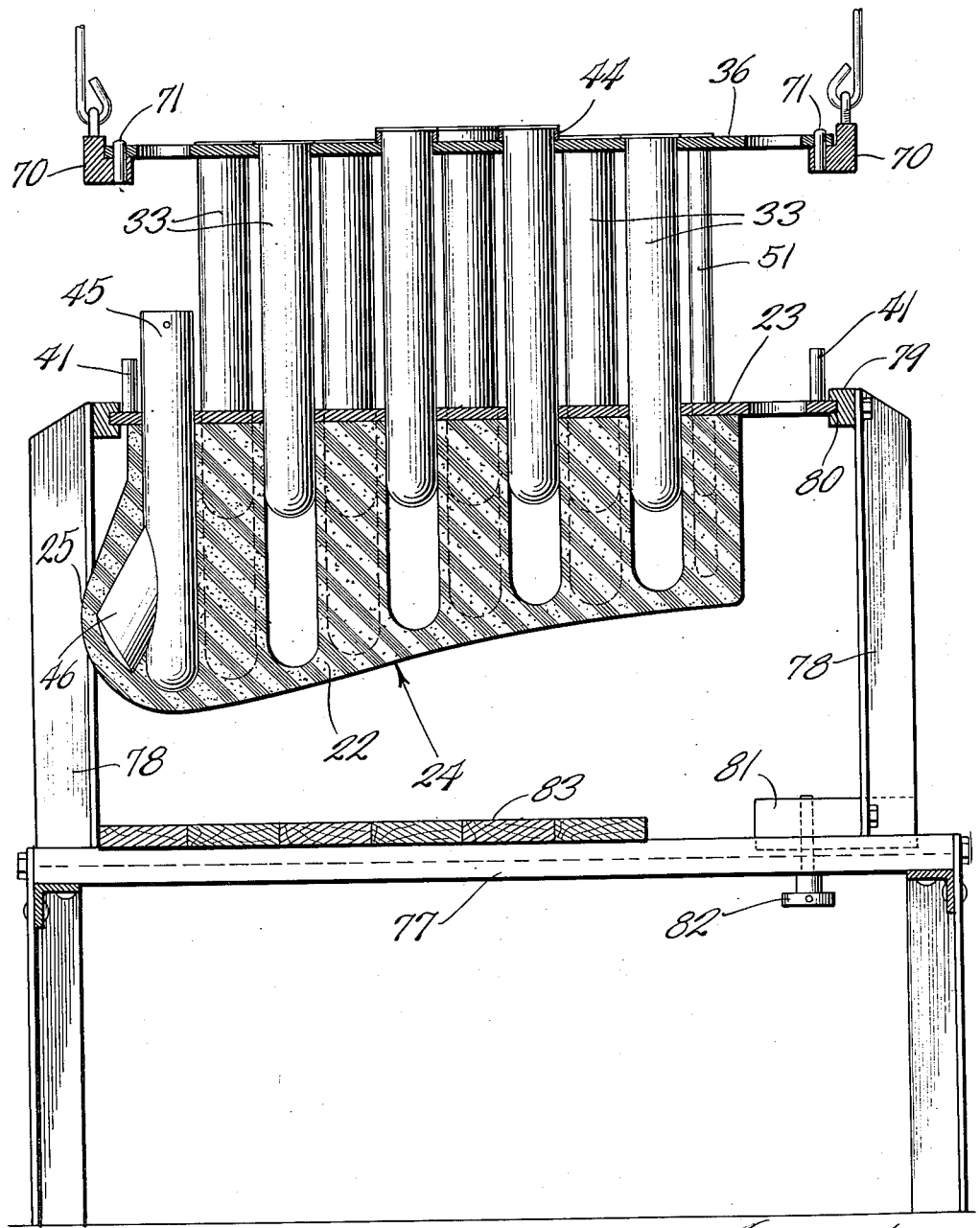

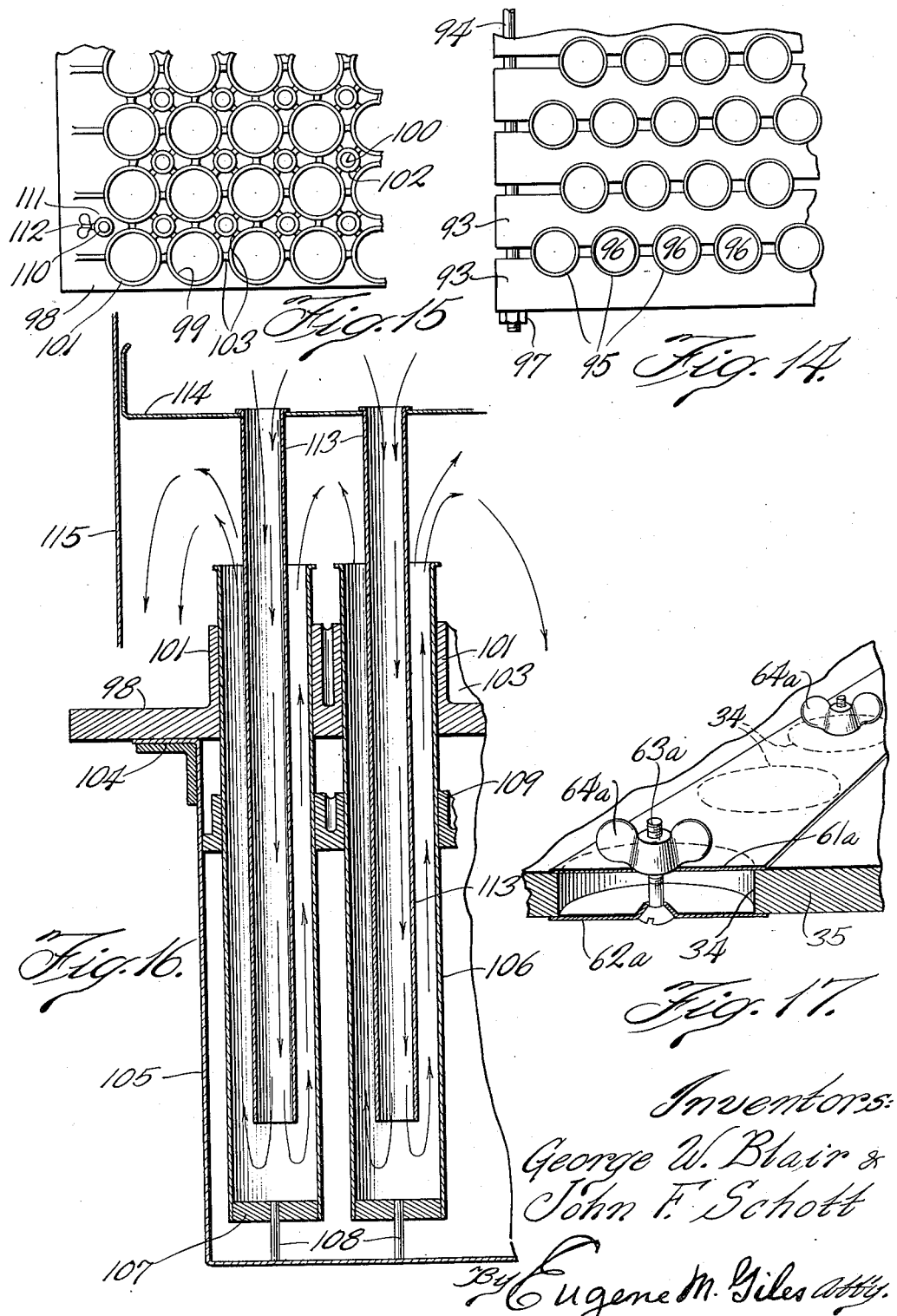

Patented Feb. 9, 1943

2,310,830

UNITED STATES PATENT OFFICE 2,310,830

MOLDING APPARATUS FOR OPEN TYPE CUSHIONS

George W. Blair and John F. Schott, Mishawaka, Ind., assignors to Mishawaka Rubber and Woolen Manufacturing Company, Mishawaka, Ind., a corporation of Indiana Application June 4, 1937, Serial No. 146,392

16 Claims. (Cl. 18—34)

Our invention relates to the formation of articles such as cushions from foam rubber or the like and has reference more particularly to facilities for providing openings throughout the mass and shaping the article in the final form.

Rubber material of the type referred to above is usually produced by employing a foaming agent with an emulsion or dispersion of rubber, as for example rubber latex, to provide a foamy mass which is relatively mobile and may be poured into molds to give it any desired shape, one preferred form of such material being disclosed in the co-pending application Serial No. 70,264 of George W. Blair, Charles E. Bradley and John F. Schott wherein rubber latex is incorporated in a separately prepared froth or foam, suitable compounding ingredients being also included in the mixture to provide an appropriate vulcanizable compound. When vulcanized, such material is soft and readily compressible and possesses qualities which make it particularly well suited for use in cushions and other like articles, the softness, compressibility and other characteristics of which may be accurately regulated by variations in the compound and the manner of preparing same.

Such cushions are preferably of open type or honeycomb form with a large number of openings or cavities therein, usually arranged to extend upwardly from the under side thereof, as such construction not only affords greater seating and riding comfort, but economizes material and minimizes weight. The openings are also preferably rounded as the shaping thereof in rounded form produces an interconnected wall structure which is highly resistant to objectionable side sway and safeguarded against breaking down strains which in other forms of such cushions have been found to greatly impair their durability.

In the making of molded cushions of the character above referred to and other similar articles with openings therein, it is necessary to provide molding equipment with coring elements to project into the mold for forming such openings in the molded mass, and when the openings are quite numerous, as they necessarily must be to insure uniform soft cushioning effect throughout the cushion surface, the expense of the coring equipment is prohibitive except for large quantity production therefrom. Cushions, however, are made in a great variety of sizes and shapes, most of which are required in insufficient quantities to warrant the expense of special coring equipment therefor, and it is accordingly desirable in order to produce molded cushions economically and in any quantity that may be desired of the various sizes and shapes, to provide coring equipment which is readily adaptable to any size and shape of cushion that may be required.

Moreover, since the texture of foam rubber is somewhat loose and brashy it is desirable to form the interconnected walls of the cushion with a skin surface, preferably of a sufficiently close texture or density to slightly retard circulation of air to and from the interior of the interconnected walls for providing a damping effect on the cushioning action, and it is important that this surface skin be somewhat substantial and tough as such skin adds greatly to the strength and durability of the interconnected wall structure.

The principal objects of our invention are to simplify and reduce the cost of molding equipment suitable for forming, from compositions such as foam rubber, cushioning and other like articles of cavitied or open type construction; to permit use of the same equipment for the making of articles of varying sizes and shapes; to facilitate withdrawal of the core elements from the molded composition; to provide a skin surface for the walls of the molded product and regulate the depth and density thereof; to facilitate the vulcanization or curing of the composition; to expedite release of the molding equipment for frequent repeated use, facilitate drying and preserve the proper shape of the article during drying without retaining in the mold,—these and other objects being accomplished as pointed out in the following detailed description of the invention, reference being made therein to the accompanying drawings, in which:

Fig. 4 is a top plan view of a core assembly superposed over a two-cavity mold in cushion molding position;

Fig. 5 is a top plan view of the lower plate of the core assembly;

Fig. 6 is an enlarged fragmentary sectional view on the line 6—6 of Fig. 4, showing certain details of the core assembly;

Fig. 7 is a top plan view of a reducer for the openings in the core assembly plates;

Fig. 8 is a sectional view of the reducer or adapter of Fig. 7 taken on the line 8—8 thereof;

Fig. 9 is a detail sectional view of a closing member for unneeded openings in the lower plate;

Fig. 10 is a perspective view of a double mold for molding two cushions simultaneously;

Fig. 11 is a perspective view of a cushion drying plate or tray with a molded cushion in place thereon;

Fig. 12 is a vertical section through the cushion and supporting tray taken along the line 12—12 of Fig. 11, but shown on a larger scale;

Fig. 13 is a vertical section through a stripper stand or jig used in removing the core elements from the vulcanized cushion and illustrating the manner in which the core elements are withdrawn therefrom;

Figs. 14 and 15 are fragmentary views illustrating modified forms of core assembly plates;

Figure 2:
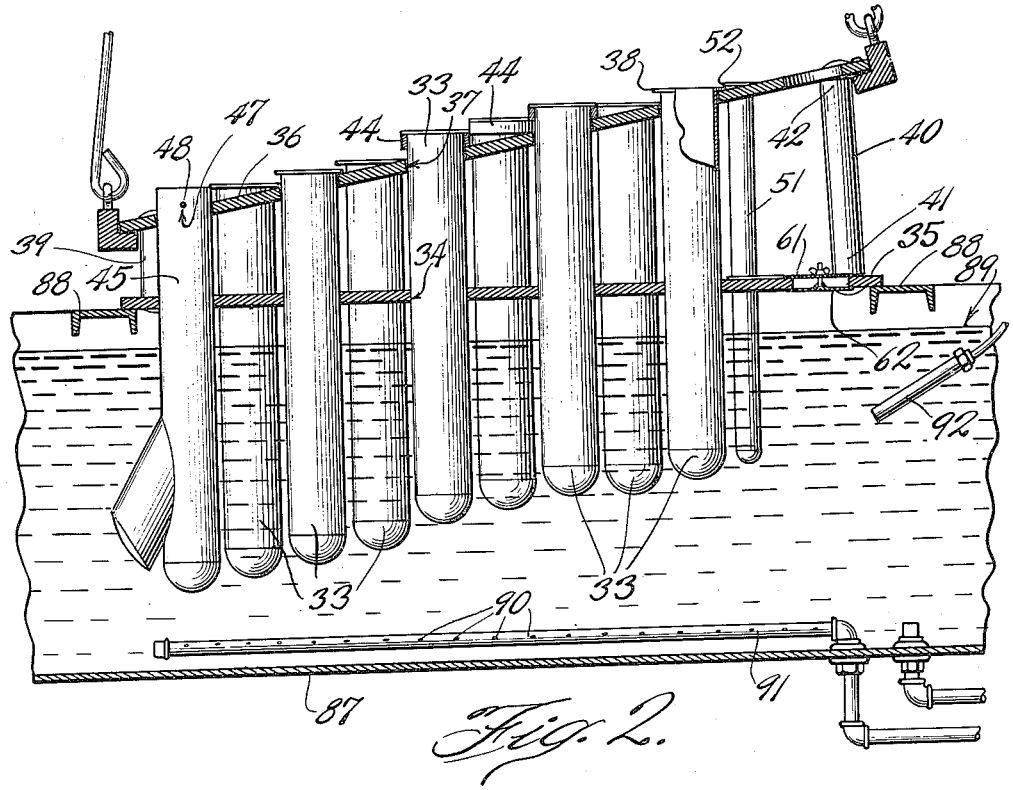
Fig. 2 is a view in vertical section of a core assembly for the mold of Fig. 1 and includes facilities for pre-heating the cores.

Fig. 16 is a fragmentary section of a modified type of molding apparatus including a special form of coring element with facilities for introducing heated fluid into the interior of the coring element and the core assembly having a lower plate that may be adjusted at desired elevations in the mold; and Fig. 17 is a detail view of a modified type of closing member for unneeded openings in the lower plate.

Referring to the drawings, and particularly Figs. 1 to 5 inclusive, which show molding equipment for making cushions of foam rubber or the like, the mold by which the molded material is given its external configuration may be of any desired size or shape, it being a particular feature of this invention that the coring equipment by which the molded article is provided with a multiplicity of openings or cavities therein, and which is a particularly expensive part of such molding equipment, is readily adaptable to molds of various sizes and shapes. In the illustrated embodiment, the mold, which is indicated as a whole at 20 and shown in perspective in Fig. 10 is provided with two mold cavities 21 for making simultaneously two seat cushions 22 (see Figs. 11, 12 and 13) which are molded in inverted position, that is, with the cushion bottom 23 uppermost in the molding operation, the particular cushions for which these mold cavities 21 are designed being of a somewhat rectangular form as shown particularly in Fig. 11, and of greater depth at the front than at the rear with the cushion top 24 sloping from the front to the rear and slightly curved and the front of the cushion provided with an overhang 25.

The mold 20 is preferably of sheet metal, each cavity 21 thereof being of cushion depth with the bottom 26 shaped to correspond to the curved sloping top of the cushion and the front wall under-bulged as indicated at 27 to form the overhanging front 25 of the cushion. A flat rim 28 extends around and between the mold cavities 21 as shown particularly in Fig. 10, over a reinforcing angle 29 (see Figs. 1 and 3) which surrounds and is secured to the mold at the top, and said mold is provided along the front and rear with depending panels 30 and 31 respectively with inturned flanges 32 along their lower edges for supporting the mold in a level position with the top thereof and the rim lying in a horizontal plane.

Referring now to the coring facilities for forming the large number of upright openings which are desirable in cushions of this character, we have provided a core assembly which is readily adaptable for use in connection with molds of various sizes and shapes to produce the required openings or cavities in the cushions or other articles that are formed in such molds, thereby greatly economizing in the equipment for molding such articles and permitting the molding of cushions and other similar open type or multiple-cavitied articles in quantities that would be insufficient to justify the expense of special coring equipment which would ordinarily be required for each different size and shape of mold.

This core assembly comprises a large number of similar core elements 33 mounted in closely adjoining parallel relation in a supporting structure so that they are readily removable individually to permit selected elements to be employed in the molding operation as required for the size and shape of the particular mold cavity and the core elements being also adjustable individually or collectively to vary the depth to which they project into the mold cavity so that the lower ends thereof may be positioned at a uniform selected distance from the bottom of the mold cavity irrespective of variations in the depth thereof. Preferably the core assembly is of such size and the number of core elements sufficient for the largest sizes of molds that may ordinarily be required, the illustrated core assembly being of sufficient length and width for molding relatively long cushions such as commonly used in passenger automobiles and capable of employment in making a number of smaller cushions simultaneously as for example, two individual seat cushions for trucks, busses, theatre seats and the like, said core assembly being shown herein as arranged for molding simultaneously two individual seat cushions in the cavities 21 of the double mold 20.

The core elements 33 which are of hollow cylindrical form to minimize weight and admit heating fluid therein to the interior of the molded mass, have their lower ends closed and rounded as shown and are preferably of metal so as to conduct heat readily therethrough to the molded material therearound and of sufficient length for any depth of cushion that may be desired. These elements 33 are slidably mounted in upright parallel relation in apertures 34 of the plate 35 which rests upon the mold and closes the mold cavity or cavities thereof in the molding operation, and said elements are adjustable in said openings 34 to project downwardly to any desired extent in the mold cavity or cavities and are readily removable from the openings 34 so that the elements which are not needed may be omitted leaving only those coring elements in such grouping or arrangement thereof as required for the particular shape and size of article to be molded.

For supporting the coring elements at the required elevation to project the proper distance into the mold cavity below the plate 35, various means may be provided, one form being shown in Fig. 2 in which we employ an upper plate 36 which is substantially coextensive with the lower plate 35 and provided with matching openings 37 through which the coring elements 33 extend, said openings 37 being preferably sufficiently large to permit tilting of the upper plate 36 at an angle to the lower plate 35 for the purpose hereinafter explained without cramping of the coring elements or substantially disturbing the parallel relation thereof. The coring elements 33 are preferably provided at their upper open ends with surrounding marginal flanges or rims 38 to engage the margins of the openings 37 of the upper plate so that said elements are supported from said upper plate.

For regulating the extent to which the coring elements 33 project below the plate 35 spacers such as indicated at 39 and 40 are provided for interposition between the plates 35 and 36, preferably at the corners thereof and midway between the ends and these spacers may be of tubular form and the plates 35 and 36 provided at the corners and midway between the ends with opposed studs 41 and 42 respectively which seat in the ends of the spacer tubes and hold the latter against displacement. By varying the length of the spacer tubes the amount of projection of the coring elements below the plate 35 may be regulated and by employing spacers of different lengths as shown at 39 and 40 in Fig. 2 the plate 36 may be arranged at an inclination to the plate 35 so that the coring elements 33 project through the plate 35 to an increasingly greater extent from one lateral edge of said plate to the other lateral edge. Preferably the plates 35 and 36 are secured together in the selected separated relation to constitute a readily separable rigid frame assembly, and any convenient means may be employed for this purpose. For example, the plate 35 may have at each end thereof an eye bolt 43 pivoted to a bracket 43ᵃ on the plate and provided with a hand wheel 43ᵇ threaded thereon to engage the forked end of a bracket 43ᶜ on the other plate 36 to lock the plates 35 and 36 in the spaced relation provided by the interposed spacers 39 and 40.

The various coring members 33 may also be individually adjusted to selectively vary the extent to which they project through the plate 35 by employing rings or short sleeves 44 of suitable lengths which are loosely engaged on the selected coring members and bear against the top of the upper plate 36. By providing such sleeves of suitable lengths and proper assortments thereof, the top plate 36 may be omitted and the proper adjustment of the coring elements 33 effected by merely interposing sleeves of the required length between the flanges or rims 38 of the coring elements 33 and the plate 35, it being preferred, however, to employ the plate 36 inasmuch as it permits group adjustment of the coring elements by merely interposing appropriate spacers such as 39 and 40 between said plates and any further adjustment that may be required will usually necessitate the employment of short sleeves or rings such as those shown at 44 on only a comparatively few of the coring elements. Moreover the employment of the plate 36 permits withdrawal of the coring elements 33 collectively from the molded article at which time the lower plate 35 serves as a stripper and the coring elements 33 remain assembled for repeated use whereas if the plate 36 is not employed it is necessary to remove the coring elements 33 individually and much time is required to reassemble the many coring elements properly for the next molding operation.

Special coring elements may also be provided such as the forked coring elements 45 which are desirable in forming cushions with an overhanging front and are arranged in a row across the cushion mold where the overhanging front of the cushion is formed. These special coring elements, like the coring elements 33, are of tubular form with the lower ends closed and rounded and are provided with a hollow tubular branch 46 likewise closed at the end. These elements preferably have a plain open upper end without the flanges or rims 38 of the other elements 33 and in place thereof are diametrically apertured near the top as indicated at 47 to receive a wire 48 which is threaded through the openings 47 of the entire row or series of special coring elements 45 and serves not only to support the elements 45 from the top plate 36 but also holds the elements 45 against turning movement with the branches 46 thereof all in the same relative position to uniformly core out the overhung front of the cushion. This wire mounting also permits release of the entire series of special elements 45 from the assembled plates 35 and 36 so that the plate assembly may be removed from these coring elements so as to leave them in the molded article when the other coring elements 33 are withdrawn therefrom, this being desirable as the special coring elements 45, because of their peculiar form with enlarged lower ends, cannot be satisfactorily withdrawn directly with the other elements 33 from the molded article and are preferably removed individually.

Figure 3:
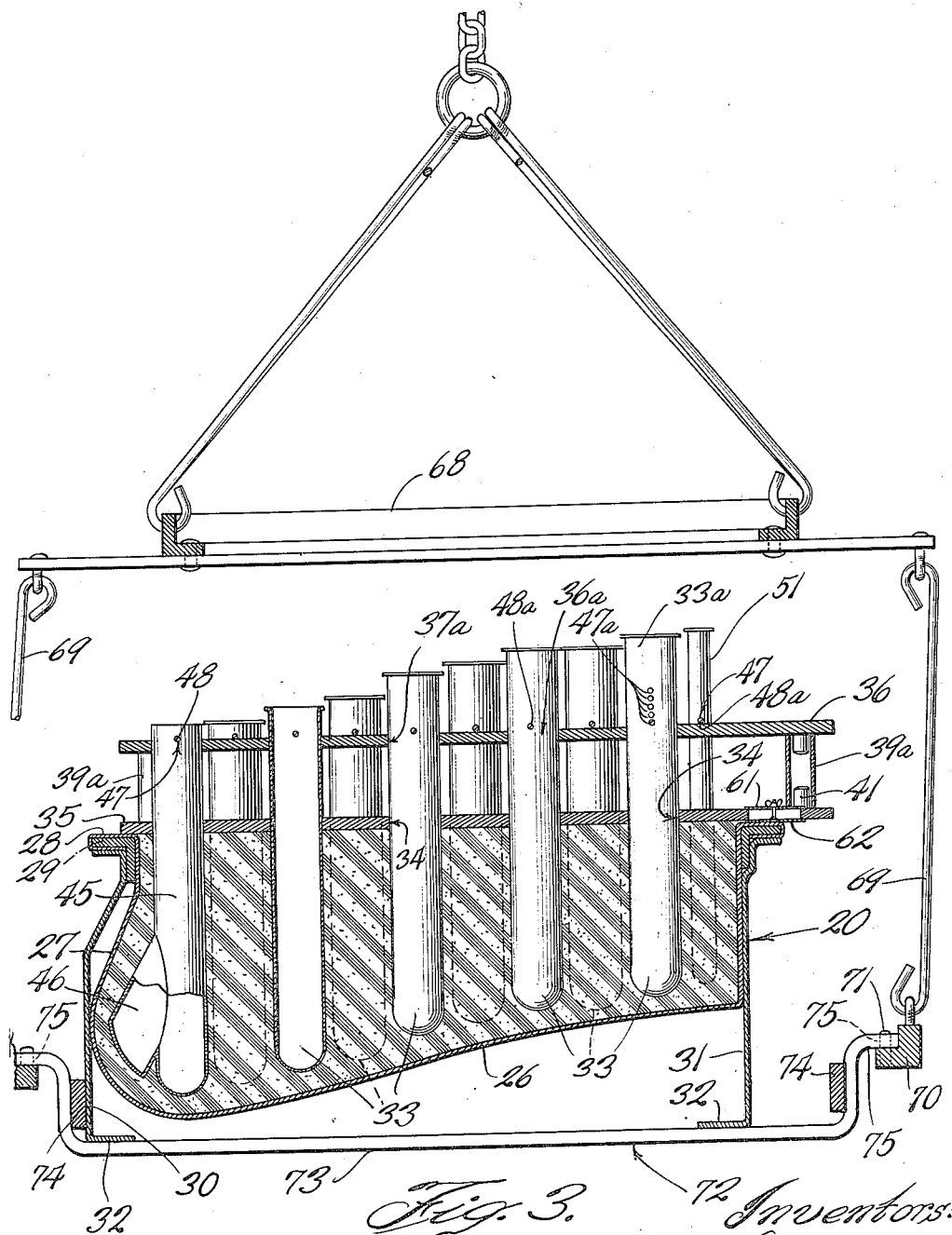
Fig. 3 is a similar sectional view showing the mold of Fig. 1 containing the rubber composition and with a core assembly applied thereto as arranged for vulcanization, said core assembly being similar to that of Fig. 2 but modified in some respects.

All of the coring elements may be suspended with wires in the same manner as the coring elements 45, as shown in Fig. 3, in which case we prefer to arrange the upper plate in parallel relation to the lower plate 35 as indicated at 36ᵃ in Fig. 3, in which case the openings 37ᵃ of the plate 36ᵃ do not need to be sufficiently large to permit tilting of the upper plate as in the case of the structure of Fig. 2. In said parallel plate arrangement of Fig. 3 spacer tubes 39ᵃ of the same length are employed between the plates 35 and 36ᵃ at both the front and rear to hold the plates in the required parallel relation and with each successive row of coring elements 33 having wires 48ᵃ extending through apertures 47ᵃ thereof, the apertures 47ᵃ of the successive rows being at different distances from the upper ends of the coring elements 33 as shown so that these elements will project the different distances into the mold cavity as required to correspond to the sloping bottom thereof. To change the elevation of the coring elements 33 other apertures or wire receiving openings 47ᵃ may be provided or each coring element may have a series of vertically spaced openings 47ᵃ as indicated in connection with the coring element 33ᵃ of Fig. 3 to provide for selective vertical adjustment thereof, and it will also be understood that when supported by the wires 48ᵃ the top flanges 38 may if desired be omitted from the upper ends of the coring elements 33 as in the case of the special coring elements 45. Clamps 43 with the arms suitably spaced to engage snugly over and under the plates 36ᵃ and 35 respectively may be employed to lock said plates in the parallel spaced relation or adjustable C-clamps or other connecting means may be employed.

It is also desirable, particularly with the staggered arrangement of the coring elements shown herein, to provide for coring elements of smaller diameter to be used along the margins of the mold to core out openings where the area is insufficient to accommodate coring elements of the regular size, and it is important that these smaller coring elements be adapted for mounting in any of the regular openings 34 and 37 or 37ᵃ of the plates 35 and 36 or 36ᵃ. For this purpose reducer plugs 49, as shown in Figs. 7 and 8 are provided each with a corresponding eccentrically disposed opening 50 of a size to accommodate coring elements 51 of the required smaller size which like the elements 33 are of hollow tubular form with the lower ends closed and rounded and the upper open ends provided with an annular rim or flange 52 like the rim or flange 38 of the elements 33. These coring elements 51 may of course be supported by wires 48a as shown in Fig. 3 in the same manner as the coring element 33 in said figure in which case the top flanges 52 may be omitted.

These reducer plugs, which are of suitable size to be inserted readily in the openings 34 and 37 or 37a of the plates 35 and 36 or 36a, preferably have an annular flange 53 around the top to rest upon the margin of the openings 34 or 37 in which they are used and are provided with locking means to hold them in the openings against rotational displacement. For this purpose a slot 54 is provided in each plug 49 forming top and bottom flanges 55 and 56 with aligning openings for a screw headed stem 57 which is riveted in place as indicated at 58 and provided with a squared stem portion 59 engaging a square opening eccentrically disposed in the cam member 60 which is interposed between the flanges 55 and 56 and rotatable by turning the stem 57 to clamp against the rim of the opening 34 or 37 in which the reducer is used.

Provision is also made to close openings 34 of the plate 35 which may be desirable in the event that unused openings 34 extend over the mold cavity, as it is preferable that the plate 35 completely close the mold cavity in the molding operation, and for this purpose a closure fitting is provided as shown in Fig. 9 consisting of upper and lower sheet metal disks 61 and 62 respectively, slightly larger than the opening 34 and centrally connected by a screw 63 and wing nut 64, the head of the screw being preferably countersunk in the lower plate 62 as indicated at 65. When it is desired to close a series of openings 34, elongated closure strips 61a and 62a of proper length to extend over the desired number of the openings 34 may be employed and secured to the plate 35 by means of a plurality of screws 63a and wing nuts 64a, as illustrated in Fig. 17.

Figure 1:
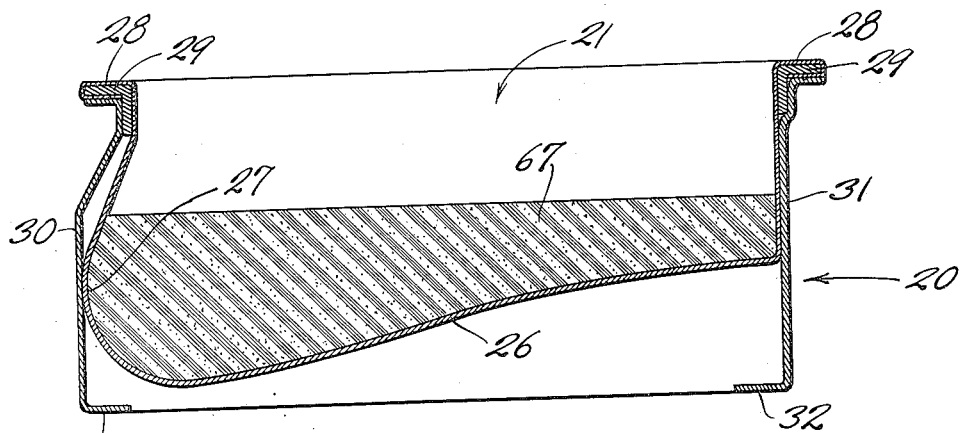
Fig. 1 is a view in vertical section of an illustrative form of cushion mold which may be used in the practice of our invention.

As a typical example of the manner in which the above described core assembly of Fig. 1 may be used for molding open type or multiple cavitied articles we have shown same herein as adapted for the molding of two cushions 22 simultaneously in the mold cavities 21 of the mold 20, which for convenience in properly locating and holding the core assembly thereon is provided, as shown in Fig. 10, with several dowels 66 to engage appropriate openings 34 of the lower plate 35 of the core assembly which is thus readily located and retained in a definite relative position on the mold throughout the molding operation.

All of the coring elements 33 are omitted or removed which are outside or only partially within the area of the mold cavities 21 when the core assembly is located in position by the dowels 66 over the mold, this being particularly indicated in Fig. 4 in which the dotted lines 21 represent the outlines of the mold cavities, 33 the retained coring elements and 37 the openings of the plate 36 in which there are no coring elements 33. Thus there are two groups of coring elements 33 located respectively to extend into the two mold cavities 21 when the coring assembly is positioned over the mold 20.

Since the cushions to be formed in the mold cavities 21 have the front portions thereof overhanging and as it is desirable to core out in the overhung portion of the cushion, openings which cannot be formed by the regular coring elements 33, the row of coring elements 33 along the front of each mold cavity 21 is also removed and replaced by the special coring elements 45 which are supported by the wire 48, these coring elements being of substantially the same length as the regular coring elements 33.

Also at the rear and along the sides of the cushion mold are widths of mold cavity in which it is desirable to core out openings where the space is not sufficient to accommodate coring elements 33. In such places reducer plugs 49 are inserted in the openings 34 and 37 above such spaces and locked therein by their locking cams 60 with the openings 50 thereof at the inner side as shown in Fig. 4 and smaller coring elements 51 are inserted in these openings 50 of the plugs 49. Unused openings 34 along the edge of the mold or elsewhere may be closed by the fittings of Fig. 9 as indicated at 61—62 in Fig. 2, this being particularly desirable where a portion of such opening 34 projects over the mold cavity 21 as the plate 35, except at the places where the coring elements project therethrough, should be substantially continuous to properly close the top of the mold cavity.

After the various coring elements and closure fittings have been applied the plates 35 and 36 are relatively adjusted, and if required certain coring elements are also separately adjusted for the particular depth of mold so that the various coring elements will project to the proper depth therein. In the case of molds such as shown herein wherein the cavities 21 have sloping bottoms, the plate 36 is not only elevated above the plate 35, according to the depth of the mold cavity 21, but is also disposed at an inclination thereto corresponding to the general inclination of the mold bottom 26 so that the lower ends of the coring elements are all spaced approximately the required distance from the mold bottom, spacer tubes 40 of the proper lengths being interposed between the plates 35 and 36 and engaged with the holding studs 41 and 42 thereof, after which the clamps 43 are slipped into clamping engagement with the ends of the plates 35 and 36 so as to hold said plates in the relatively inclined assembled relation. Further adjustments are effected to conform to the curved form of the mold bottom by applying spacer rings or sleeves 44 of the proper length on certain coring elements between the rims 38 thereof and the plate 36 as shown whereby all of the coring elements are arranged at a substantially uniform distance from the bottom of the mold cavities when the plate 35 rests on the top of the mold. The coring assembly is then ready for the molding operation.

The foam rubber or other material from which the cushions are to be molded is preferably placed in the mold cavities 21 while the coring assembly is removed therefrom, a measured quantity thereof which has been found sufficient for molding the cushion being poured into each mold cavity as indicated at 67 in Fig. 1 after which the coring assembly is positioned on the mold in proper engagement with the dowels 66 and with the various coring elements projecting into the mold and the core assembly plate 35 resting on the rim 28 of the mold, in which position the level of the foam rubber 67 is raised by the entry of the coring elements into the mold so that the top surface thereof is flush with the under surface of the cover plate 35.

The mold with the foam rubber therein and coring assembly thereon is then placed in a vulcanizer and subjected to curing temperature until the foam rubber is cured, after which the coring elements and molded articles are removed from the mold and the coring elements removed from the molded articles which have the openings 45$^a$, 33$^a$ and 51$^a$ corresponding respectively to the coring elements 45, 33 and 51. The molded article is then dried and after drying is ready for cushion use, it being understood, of course, that the cushion body is mounted on a suitable supporting deck or frame and usually has a covering of fabric or the like applied thereover in the finished cushion.

The combined mold and core assembly, especially in large molded articles, is sufficiently heavy so that it is desirable to handle them mechanically and for this purpose a hoist is provided with a frame 68 having a pair of grapples or links 69 at each side for supporting and lifting the core assembly and parts thereof, and this hoist is preferably on a carriage of an overhead track by which the assembled mold and coring facilities may be transported to and from the vulcanizer and to and from the various stations as required in the preparations for molding and in the molding operations. Neither the hoist nor the traveling carriage or track are shown herein as they are well known and form no part of the present invention. The grapples or links 69 have blocks 70 at their lower ends with laterally offset upwardly projecting studs 71 for detachable connection with the core assembly and with a mold supporting cradle 72 which comprises a pair of centrally depressed bars 73 suitably spaced to engage under and support the mold, as shown in Fig. 3, and connected by side members 74, the opposite ends of the bars 73 being elevated and provided with apertures 75 to receive the studs 71 of the connecting blocks 70 to support the mold supporting cradle 73 from the hoist. For attachment of the core assembly to the hoist the upper plate 36 has a pair of apertures 76 at each lateral edge suitably spaced to receive the connecting block studs 71 of the grapples or links.

In the molding operation, the mold 20 is placed on the mold supporting cradle 72 which is in turn mounted on the floor or any suitable stationary support, and after the proper amounts of foam rubber have been poured into the mold cavities 21, the core assembly, which is supported by the hoist, is moved thereby into position over the mold 20 and lowered into position thereon, whereupon the studs 71 of the grapple or link connecting blocks 70, which were engaged in the apertures 76 of the core assembly plate 36 to support the core assembly from the hoist, are disengaged from said apertures 76 and engaged with the apertures 75 in the elevated ends of the cross bars 73 of the mold supporting cradle 72. The cradle 72 with the coring assembly and filled mold may then be lifted by the hoist and transported to the vulcanizer and after vulcanization of the foam rubber are in like manner removed from the vulcanizer and taken to the station where the mold is removed from the molded article. This may be readily accomplished at said station by disengaging the grapple blocks 70 from the mold supporting cradle 72 and engaging same with the apertures 76 of the mold assembly plate 36 and lifting the mold assembly and the molded article therewith from the mold 20 which is readily released from the molded article inasmuch as the vulcanized foam rubber at that stage is quite soft and yields readily to free the mold.

Thereafter the coring elements are removed from the molded article, in which operation it is preferred to employ a suitable jig or frame and utilize the lower plate 35 of the mold assembly as a stripper member. Such jig or frame may be of the construction shown in Fig. 13, comprising a bench or table 77 with a pair of standards 78 at each side of and extending upwardly from the bench or table and each pair of standards 78 carrying at their upper ends a channeled rail 79, the two rails 79 being at the same elevation and spaced apart a suitable distance and with their channels 80 facing inwardly to accommodate the lateral edges of the core assembly plate 35 for supporting the latter. These channeled rails 79 may be spaced apart a fixed distance and the core assembly plate 35 may be slid endwise into engaging relation with the opposed channels 80 or the standards 78 of one of the rails 79 may be secured to a base member 81 which is adjustable transversely of the bench or table 77 and adapted to be secured in adjusted positions by hand screws 82. With this arrangement, the corresponding edge of the core assembly plate 35 may be engaged with the channel 80 of the non-adjustable rail 79 while the other rail 79 is retracted, whereupon the base member 81 may then be moved inwardly to engage the rail 79 supported thereon with the other edge of the plate 35 and the base member 81 secured in position by the hand screws 82 to lock the plate 35 in position with its edges engaged in the channels 80 of the rails 79.

After the core assembly with the molded article clinging to the coring elements has been mounted on the jig or frame with the core assembly plate 35 engaged in the channels 80 of the rails 79, the wire 48 is withdrawn to release the special coring element 45 from the plates 35 and 36 and the clamps 43 and spacer tubes 39 and 40 are removed so that the plates 35 and 36 are released from one another. The hoist, which has been attached to the core assembly plate 36 for transporting the core assembly and molded article to the jig or frame of Fig. 13, and which has remained attached to said plate 36, is then lifted and with it the core assembly plate 36 and all of the coring elements except the special elements 45, and as the plate 35 is held stationary by its engagement with the jig rails 79, this latter plate serves as a stripper member to hold the molded article thereunder and as the lifting of the plate 36 continues the coring elements are all collectively withdrawn from the molded cushion, excepting the special coring elements 45 which remain therein and drop down with the molded cushion 22 onto the top 83 of the bench or table 77 when the other coring elements have been withdrawn. The special coring elements 45 are then withdrawn individually by hand from the molded cushion which may be readily done as the material of the molded cushion, after vulcanization and before drying, is quite soft and flexible and stretches readily to permit withdrawal of the forked lower ends of the elements 45.

After the cores 33 and smaller cores 51 have been removed from the molded cushion they are reinserted in the apertures of the plate 35 and of the reducers 49 and the spacer tubes 39 and 40 are replaced between the plates 35 and 36 which are then locked together by the clamps 43 and after the special coring elements 45 have been secured in the core assembly frame by the wire 48 the core assembly is ready for the next molding operation.

In making cushions or other articles with the parallel plate coring arrangement of Fig. 3 the procedure is substantially the same as that recited above in connection with the coring arrangement of Fig. 1, the coring elements 33 and 51 in the Fig. 3 structure merely being arranged at the proper elevations for the particular mold cavity by inserting the wires 48a therethrough at the proper distances from the upper ends thereof to support said elements so that they project the desired distance into the mold cavity, and the plates 35 and 36a being held in parallel relation by the spacers 39a and clamps 43 or any other connecting means suitable for the purpose and the special coring elements 45 being also suspended by wires extending therethrough in the same manner as they are suspended in Fig. 2 and in the same manner as the other elements 33 and 51 in Fig. 3.

This coring arrangement, being thus assembled, is employed in the same manner as the coring arrangement of Fig. 2 in making the cushions or other articles and stripped from the vulcanized cushion in like manner by holding the lower plate 35 while the coring elements 33 and 51 are withdrawn therethrough by lifting the upper plate 36a. If the coring elements 33 and 51 are provided with top flanges 38 and 52 it may be advantageous to remove the wires 48a before lifting the plate 36a to strip the coring elements from the molded article as the plate 36a will then engage first the flanges 38 and 52 of the lowermost coring elements and start the removal of these from the article and consecutively thereafter will engage the flanges 38 and 52 of the succeeding next higher rows of coring elements and thereby facilitate the removal of the cores by progressively lifting and starting withdrawal of certain coring elements before others are lifted.

The removal of the coring elements from the molded article may of course be accomplished either before the mold 20 is removed therefrom or thereafter as indicated in connection with Fig. 13 and the upper plate may be held stationary if desired while the lower plate 35 is retracted therefrom to strip the molded article from the coring elements. If however, the coring elements are withdrawn from the article before the latter is removed from the mold it is preferred to support the mold during the operation and for this purpose a mold supporting platform may be provided which is preferably vertically adjustable as for example by an air lift to elevate the mold and the molded article therein to the position for engaging the plate 35 with suitable means by which the plate 35 is held stationary during the withdrawal of the coring elements, and the mold is retained in such elevated position until the coring elements are withdrawn.

In practice we employ in the making of the above molded cushions a foam rubber prepared in accordance with the disclosure of the above mentioned co-pending application Serial No. 70,264 of George W. Blair, Charles E. Bradley and John F. Schott, and to cure the molded cushion made therefrom, the core assembly and mold with the molded article therein is placed in a vulcanizer and subjected for about an hour to circulating air, the temperature of which is initially at approximately 125° F. and gradually increased during that time to a final temperature of approximately 212° F.

Then live steam which may be superheated, is introduced into the circulating air and the temperature gradually increased during about twenty minutes up to 220° F. and then held at that temperature for fifty minutes while the steam supply is continued, and it will be understood that during the curing treatment heat is communicated to the interior of and throughout the molded mass through the walls of the coring elements from the heating fluid which enters the hollow coring elements and the molded mass is thus readily and uniformly cured.

When taken from the vulcanizer the molded mass is somewhat flaccid and wet and it is necessary to dry the material before the cushion is ready for use. Accordingly, after the vulcanized cushion has been removed from the mold and the cores removed therefrom it is placed in an air circulating dryer and subjected to circulating air at a temperature of about 190° F. for about fourteen to twenty-four hours.

In this drying operation it is important not only to permit access of the air to the cushion surfaces to facilitate drying but also to support the cushion loosely to permit the shrinkage of the cushion which occurs to the extent of about one and one-half to two percent in the drying and furthermore, since the cushion material, before drying, is quite flaccid and may assume a distorted form if not maintained in the desired finished shape during drying it is necessary to hold the cushion during drying in the desired finished form. This could be accomplished by retaining the cushions during drying in the mold cavities in which they have been formed and vulcanized, but it not only is desirable to release the molds for further molding operations, but also to support the cushion during drying so that there is more complete exposure to the air than would occur if retained in the mold.

We have accordingly provided pans such as shown at 84 in Figs. 11 and 12 which may be constructed at comparatively small expense for holding the cushions in the drying operation, these pans being made of sheet metal shaped to correspond to the desired contour of the top and overhanging front of the finished cushion and preferably with the lateral edge portions sloped upwardly as indicated at 85 and reinforced by straps 86, and the molded cushions, after removal from the mold and removal of the coring elements therefrom are placed in inverted position on these individual pans 84 and retained thereon in that position throughout the drying operation. Thus all the surfaces of the molded cushion, except the bottom surface and a portion at the front, are exposed to the circulating air in the dryer and the cushion retained in proper shape to prevent distortion thereof during drying with the result that drying is facilitated and the finished cushion is perfectly formed.

Articles molded from foam rubber and the like are usually employed for cushioning purposes and especially in seat cushions are subjected not only to frequent and oftentimes severe compression, but also to side sway, all of which imposes considerable strain on the cushion and requires a material and construction that will adequately counteract and withstand same.

Moreover it is important, particularly in seat cushions for vehicles, to provide soft and easy cushioning effect without objectionable rebound.

The soft and easy cushioning effect is provided in cushions such as described above, not only through the character and composition of the material which we prefer to employ as indicated above, but also through the multiplicity of openings which insure substantially uniform softness and compressibility throughout the cushion area without regions of appreciably greater stiffness which occur when a heavy and widely spaced rib or wall structure is employed on the underside of the cushion, and moreover with the multiplicity of openings of rounded form the resultant multiplicity of wall interconnections and curvature of the walls effectively braces the walls against lateral collapse and the cushion against side sway and not only insures maximum compressive resistance and high cushioning efficiency at all times, but also affords great strength and durability to resist strains which have been found to impair the durability of molded cushions of other forms.

In view of the rough and open texture of the material of these molded cushions it is desirable to provide the cushion with skinlike surfaces, particularly throughout the interconnected wall structure thereof, as such skin surfacing if of proper texture and density, not only retards circulation of air to and from the interior of the interconnected walls and thereby provides a damping action which improves the cushioning effect and eliminates rebound, but such skin provides a relatively tough surface structure giving the cushion walls added strength to effectively withstand any excessive breaking or tearing strains to which they may be subjected.

We have found that the formation of this skin structure is promoted by proper temperature of the walls with which the foam rubber comes in contact initially in the mold and that by preheating the coring elements of the core assembly to a suitable temperature before introducing them into the foam rubber in the mold a substantially tough skin may be formed throughout all the surfaces of the molded article that are formed in contact with the heated coring elements.

Preferably, therefore, the coring elements are heated to a predetermined temperature before application thereof in the foam rubber 67 of the mold cavities 21 and for this purpose a tank 87 is provided, a section of which is shown in Fig. 2, and which may be of suitable length to accommodate a number of mold assemblies, and this tank has cross beams 88 extending across the top thereof and suitably spaced to support the core assembly by engagement under the opposite ends of the core assembly plate 35 as shown. Water is maintained at a level as shown at 89 in the tank so that when the core assembly is supported on the rails 88 the portions of the cores below the plate 35 are submerged throughout the greater part of their length in the water. The water may be heated in any desired manner, as for example by introducing steam therein through orifices 90 in a pipe 91 at the bottom of the tank, the supply of steam being regulated by a valve controlled by a thermostat the bulb 92 of which is immersed in the water in the tank 87 so that the water is maintained at a uniform selected temperature for which the thermostat is set. The thermostatically controlled valve and the connection of the bulb 92 therewith are not shown as these are well known and of themselves form no part of the present invention.

The temperature of the water in the tank may be varied according to the skin formation desired on the molded article, but we have found that a temperature between 140° and 150° gives the best results and the thermostatic control is accordingly set to maintain the water at some point within that range of temperature. The coring elements are retained in the water sufficiently long to be heated to the temperature of the water bath and after the foam rubber has been poured into the mold the core assembly is taken directly from the water bath and applied on the mold so that the coring elements are at the bath temperature when they come in contact with the foam rubber. Thus the molded foam rubber cushion is provided throughout the surfaces of the interconnected walls thereof with a substantial tough skin which greatly increases the durability of the cushion and slightly retards the flow of air to and from the interior of the interconnected walls as the cushion is compressed and released and provides a damping effect that contributes greater comfort and ease to the riding qualities of the cushion.

Other forms of plates and coring elements may be employed in the core assembly, two forms of plates being shown in Figs. 14 and 15. The plate of Fig. 14 is composed of a number of sections 93 assembled on rods 94 and provided with opposed arcuate notches 95 in the edges of adjoining sections to accommodate coring elements 96 which may be the same as the coring elements 33 previously described, and the sections 93 may be assembled sufficiently loosely on the rods 94 so that the coring elements 96 are slidable in their respective openings or the rods 94 may have nuts 97 threaded thereon to clamp the coring elements 96 in any desired positions of adjustment between the plate sections 93. Obviously this form of plate has the advantage that the size thereof may be varied by employing rods 94 of appropriate length and increasing or decreasing the number of sections 93 thereon.

The plate shown in Fig. 15 and which is indicated by the reference numeral 98 differs from the core assembly plates hereinbefore described in the respect that the openings 99 for the principal coring elements are not staggered but are arranged in rows transversely and longitudinally of the plate and smaller openings 100 for smaller coring elements are staggered between said rows. Sleevelike formations 101 and 102 with connecting ribs 103 are provided around the core openings 99 and 100 respectively to provide a length of bearing for the coring elements to maintain them in exact parallel relation.

This plate 98 of Fig. 15 is particularly adapted to mold apertured slabs of foam rubber and is shown in Fig. 16 mounted on the rim 104 of a mold 105 for molding such slab, said mold 105 being of uniform depth so that the plate 98 resting on the mold rim 104 is parallel with the bottom of the mold. The coring elements used with this plate may be like those previously described herein, but in the slab formation are preferably as shown at 106 in Fig. 16 with flat closures 107 at their lower ends and small depending pins 108 which rest upon the mold bottom and thus determine the elevation of the coring elements which are free to slide in the openings 99 and 100 of the plate 98.

For varying the thickness of the slab formed in the mold 105 and surfacing the top thereof an auxiliary plate 109 is provided which has openings matching the openings 99 and 100 of the plate 98 and through which the cores of the upper plate 98 extend, and said plate 109 is of a size to slip downwardly in the mold 105. Stems 110 (see Fig. 15) extend upwardly from the plate 109 through openings 111 in the plate 98 which are provided with wing set screws 112 to clamp the rods 110 thereon and thus hold the auxiliary plate 109 at a selected distance from the plate 98 so that it will project downwardly in the mold 105 to form a slab of desired thickness in the portion of the mold 105 therebelow.

In Fig. 16 we have also indicated special facilities for introducing heating fluid into the interior of the coring elements to facilitate vulcanization. These facilities, which are in the vulcanizer, consist of tubes 113 carried on a plate or frame 114 which cooperates with surrounding walls 115 to close off the space above the plate 114 from the space therebelow in which the mold is placed for vulcanization, said plate 114 being vertically adjustable along the walls 115 to raise and lower the tubes 113 which are spaced to correspond to the spacing of the coring elements of the core assembly plate 98 so that when the mold is placed in the vulcanizer the plate 114 and tubes 113 may be lowered so that the tubes 113 extend downwardly into the coring elements near to the bottom thereof substantially as shown in Fig. 16. The heating medium for vulcanization is then supplied to the space above the plate 114 which is sufficiently confined to force such heating medium to flow downwardly in the tubes 113 to the bottoms of the coring elements 106 and then upwardly in said coring elements around the outside of the tubes 113 and outwardly from the coring elements 113 into the space below the frame or plate 114, as indicated by the arrows in Fig. 16, so that a positive circulation of the heating medium is provided in each coring element to insure rapid and thorough vulcanization of the molded mass in the mold 105 around the cores.

It is to be understood, of course, that the plate 98 and its coring elements 106 may be used with molds of forms other than the flat bottom mold 105 in connection with which they are shown in Fig. 16, as for example with molds of the character shown in Fig. 10 in which the mold cavities have a sloping or curved bottom, as the coring elements are self-adjusting as to depth thereof in the molds since when the plate 98 is supported on the rim of the mold, each coring element 106 will drop downwardly until the pin 108 at the lower end thereof engages the portion directly thereunder of the bottom wall of the mold cavity and accordingly the coring elements 113 will be uniformly spaced from the bottom of the mold cavity irrespective of elevational irregularities thereof.

Moreover, it is to be understood that the plate and tube structure 113—114 may be employed with coring elements other than those shown in Fig. 16 for insuring positive circulation of heating fluid throughout the length of the interior of the coring elements, as for example with the coring elements of the core assembly of Fig. 3, it being merely necessary to arrange and space the heat conducting tubes 113 to enter the coring elements of the particular core assembly and perhaps elevate certain tubes 113 of the plate 114 to correspond to the varying distances to which the coring elements 33 project into the mold cavity. It has been found that if the heating medium employed in the vulcanizer during vulcanization is sufficiently moist or if sufficient steam is introduced therein to insure a moist atmosphere within which vulcanization takes place, heat is readily and uniformly communicated into the interior of the coring elements and throughout the molded mass without these special facilities for introducing the heating medium into the interior of the coring elements and such facilities are accordingly unnecessary unless a dry atmosphere is employed in vulcanizing.

While we have shown and described our invention in a preferred form, we are aware that various changes and modifications may be made therein without departing from the principles of our invention, the scope of which is to be determined by the appended claims.

We claim as our invention:

1. A device for molding articles with a plurality of elongated substantially parallel cored out openings therein, said device comprising a mold pan with a cavity therein of varying depth, a removable cover and fastening means by which the cover is secured to the mold pan to close the cavity, said cover having a plurality of apertures therethrough, and elongated coring elements mounted in said apertures to close same and project into the mold cavity, said elements being individually shiftable lengthwise in their respective apertures for adjustment according to the varying depth of the cavity of the mold pan.

2. A device for molding articles with a plurality of elongated substantially parallel cored out openings therein, said device comprising a plate having a plurality of apertures therethrough throughout a substantial area thereof, a mold pan having a cavity less extensive than the apertured area of and closed by said plate, means for securing the plate to the pan, and removable elongated coring elements selectively grouped in those apertures of the plate opposite the cavity of the mold pan and projecting into said cavity, said elements being individually adjustable lengthwise in said apertures.

3. In a gang coring device of the class described, the combination of a plate member having spaced apertures throughout the area thereof, a plurality of elongated coring elements slidably mounted in selected apertures of the plate, reducers engaged in other apertures of the plate member, and other coring elements of smaller cross section slidably mounted in the reducers.

4. In a gang coring device of the class described, the combination of a frame, a plurality of elongated, laterally spaced, substantially parallel coring elements supported by the frame and projecting laterally from one side thereof, and means by which selected groups of coring elements are collectively and uniformly adjustable longitudinally and differentially with respect to the other coring elements to regulate the extent to which said selected coring elements project from said frame.

5. In a gang coring device of the class described, the combination of a pair of superposed and spaced frame members, a plurality of elongated, laterally spaced, substantially parallel coring elements supported in a quick detachable manner by said frame members and having the ends thereof projecting beyond the outer face of one of said members, the other of said members being adjustable to vary the distance to which the coring elements project beyond the one member aforesaid and each coring element being individually adjustable to individually vary its distance of projection.

6. The combination of a mold having a mold cavity under-bulged at one side, a gang coring device with a plurality of elongated coring elements adapted to project into the mold cavity and including a series of coring elements laterally offset to extend into the under-bulged side of the mold cavity, and core element supporting means from which said coring elements depend, said series of laterally offset coring elements being releasably connected with said supporting means whereby the other coring elements are withdrawable from the mold cavity separate from said series of coring elements.

7. The combination of a mold having a mold cavity therein, a core assemby having a plurality of elongated coring elements mounted in a quick detachable independently adjustable manner and adapted to project into the mold cavity, said elements having stems projecting between the ends thereof and the bottom of the mold cavity for spacing the ends of the coring elements from the bottom of the mold cavity.

8. The combination with a mold having a mold cavity therein with a bottom, a core assembly having a plurality of elongated coring elements adapted to project into the mold cavity, and a plate in the mold cavity through which the coring elements project, said plate being adjustable independently of the coring elements to vary the elevation of the plate from the bottom of the mold cavity and each coring element being independently adjustable to vary the length thereof projecting through the plate.

9. A coring device comprising a mold cover having a plurality of core receiving openings, a vertically tiltable core supporting frame above the cover and having a plurality of core receiving openings registered with the openings of the cover, a plurality of cores, each core occupying registered openings in the cover and the frame and being freely insertible and removable and freely adjustable endwise therein and freely tiltable in its opening in the frame to permit the core to gravitate into an upright position upon tilting of the frame, and means for supporting each core on the frame in a plurality of selected elevations independently of each of the other cores.

10. A coring device comprising a plurality of cores, a vertically tiltable frame from which the cores depend, and means for supporting the frame in selected vertically tilted positions, the cores being loosely connected to the frame so as to automatically gravitate into upright positions in any vertically tilted position of the frame.

11. The combination of a mold cover having a plurality of core receiving openings, a vertically tiltable core supporting frame above the cover and provided with a plurality of core receiving openings registered with the openings in the cover, a plurality of cores extending through registered openings in the frame and the cover, and means for supporting the frame in selected vertically tilted positions, the cores being loosely connected to the frame so as to automatically gravitate into upright positions in any vertically tilted position of the frame.

12. In a coring device, the combination of a combined mold cover and core stripper plate having a plurality of core receiving openings therein, a plurality of mutually independent cores, each core occupying an opening in the cover plate and projecting above and below the plate and movable endwise through its opening, a core supporting plate separate from the cover plate and having core receiving openings registered with the openings in the cover plate and receiving the respective cores, means for supporting each core independently of each of the other cores and at vertically selected elevations on the core supporting plate, said core supporting plate being bodily movable and tiltable vertically independently of the cover plate, and means to support the core supporting plate in vertically adjusted positions and in tilted positions with respect to the cover plate.

13. In a gang coring device, a mold cover plate having a plurality of core receiving openings, a plurality of cores removably occupying certain core receiving openings and removable closure means for the other openings, said closure means being substantially flush with the bottom face of the cover plate to continue the continuity thereof across the bottoms of the openings not occupied by cores.

14. A sectional vulcanizing mold for rubber products, said mold comprising a base section that is formed with a cavity having a wall of sheet metal, and a cover section carried by said base section, said cover section carrying mandrels that extend into said cavity, said mandrels being hollow and having their interiors open to the exterior of the mold.

15. A sectional vulcanizing mold for rubber products, said mold comprising a base section that is formed with a molding cavity defined by a bottom wall and upstanding sides, and a cover section providing a top wall for said cavity and carrying mandrels that extend into said cavity, said mandrels being hollow and having their interiors open to the exterior of the mold, one of said walls being disposed angularly with respect to the other wall whereby a product varying in thickness from side to side can be prepared in said mold.

16. A sectional vulcanizing mold for rubber products, said mold comprising a base section that is formed with a cavity, and a cover section carried by said base section, said cover section carrying mandrels that extend into said cavity, said mandrels being hollow and having their interiors open to the exterior of the mold.

GEORGE W. BLAIR.
JOHN F. SCHOTT.